March 8, 1960  F. K. H. NALLINGER  2,927,800
SUSPENSION SYSTEM FOR MOTOR VEHICLES
Original Filed Sept. 30, 1949  2 Sheets-Sheet 1

INVENTOR.
FRIEDRICH K.H. NALLINGER.

BY Dicke and Craig
ATTORNEYS.

March 8, 1960  F. K. H. NALLINGER  2,927,800
SUSPENSION SYSTEM FOR MOTOR VEHICLES
Original Filed Sept. 30, 1949  2 Sheets-Sheet 2
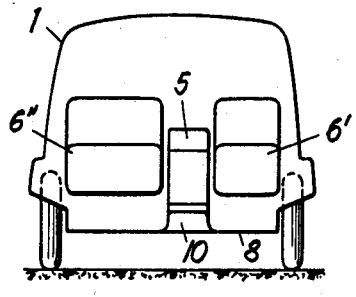
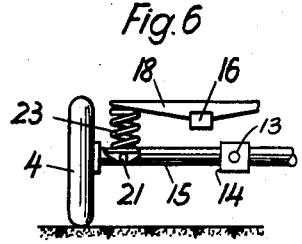
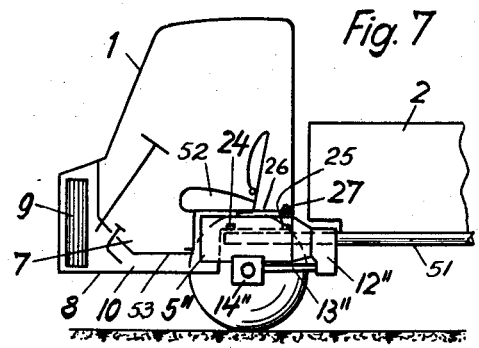
INVENTOR
FRIEDRICH K.H.NALLINGER.
BY Dicke and Craig
ATTORNEYS.

United States Patent Office 2,927,800
Patented Mar. 8, 1960

2,927,800
SUSPENSION SYSTEM FOR MOTOR VEHICLES

Friedrich K. H. Nallinger, Stuttgart, Germany

Original application September 30, 1949, Serial No. 118,736, now Patent No. 2,700,428, dated January 25, 1955. Divided and this application October 19, 1954, Serial No. 463,987

Claims priority, application Germany October 1, 1948

7 Claims. (Cl. 280—106.5)

The present application is a divisional application of my copending application, Serial No. 118,736, filed September 30, 1949, entitled "Motor Vehicles with Cab over Engine," now Patent No. 2,700,428.

The present invention relates to certain improvements in the construction of motor vehicles, and more particularly of small commercial vehicles, such as, for example, trucks or delivery cars provided with the motor thereof at the front end.

Accordingly, it is an important object of the present invention to provide a motor vehicle of the type described hereinabove which possesses a favorable empty weight and offers a favorable spatial arrangement.

It is another object of the present invention to provide a motor vehicle of the commercial type offering a particularly favorable spatial arrangement which may be realized by the provision of a frame having two longitudinal bearer members, spaced from each other a relatively small distance and enclosing an engine on both sides thereof, which engine is built of relatively small height with the seat extending over the engine, whereby the frame terminates approximately under the seat so as to provide a free space in front thereof.

Another object of the present invention is to provide a vehicle with a driver's cab which permits an unimpeded vision of the road and a large freedom of motion for the driver and attendants together with favorable entrance and alighting conditions.

A particular object of the present invention is to provide a foot space which is substantially not or not at all lessened or interfered with by the engine and the frame or chassis.

Still another object of the present invention is to provide a motor whose overall height is so low that it can be accommodated under the seats of the driver's cab.

Still another object of the present invention resides in the provision of a particularly simple, light, and cheap construction of a commercial type motor vehicle, especially as regards a light chassis, which offers sufficient stiffness and rigidity against torsional stresses and which is characterized by a simple and efficient springing or cushioning of the axles.

It is still another object of the present invention to provide a spring suspension of the wheels or axles on the frame or chassis of motor vehicles of the commercial type, especially of motor vehicles of relatively short construction, which is particularly simple and is reliable in the complete absorption of all forces between the wheels and the frame.

A still further object of the present invention resides in the provision of a frame, especially of a frame consisting of two longitudinal bearer members spaced apart only a relatively small distance, which is traversed by cross members, wherein springs, especially helical coil springs abut with the upper ends thereof against the outer ends of the cross members and with the lower ends thereof against torque rods which serve as guides and longitudinal supports of the front and rear axles.

Still another object of the present invention is to provide a construction for commercial type motor vehicles in which the driver's cabin as well as the motor and the motor gear block or transmission are arranged very close to the front end of the vehicle, preferably with a low center of gravity, so that the front axle is well loaded. In that case, the useful space can be extended in a forward direction up to the front wheels, and in case of a fully loaded vehicle the front and rear axles can be uniformly loaded. The wheel base may be made very short and my novel vehicle thus can be made particularly light and maneuverable.

Other and further objects, features and advantages of the present invention will become more obvious from the following description when taken in connection with the accompanying drawing which shows, for purposes of illustration only, several preferred embodiments of the present invention, and wherein Figure 1 is a side elevational view of a first embodiment of the invention, with the left hand side wall of the driver's cab detached, Figure 2 is a horizontal sectional view taken along line II—II of Figure 1 with a loading trough not shown for clarity's sake.

Figure 5 is a sectional front view taken along line V—V of Figure 1,

Figure 6 is a sectional view of a section taken along line VI—VI of Figure 2, and, Figure 7 is a partial sectional view of another embodiment of the invention.

Figure 1:
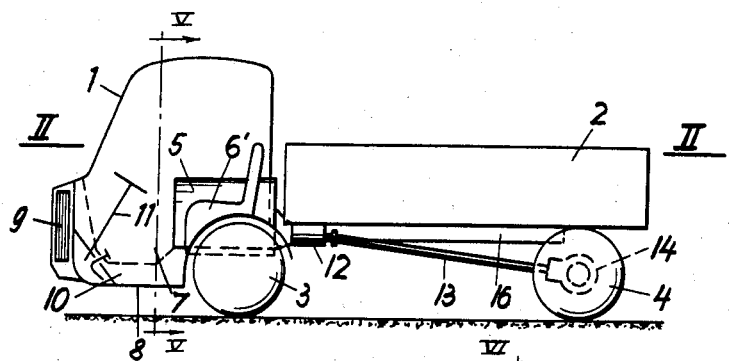

Referring now more particularly to the drawing, wherein similar reference numerals denote similar parts in the different views thereof, reference numeral 1 designates the driver's cab, reference numeral 2 the loading trough, reference numerals 3 the front wheels and reference numerals 4 the rear wheels of the vehicle.

Figure 2:
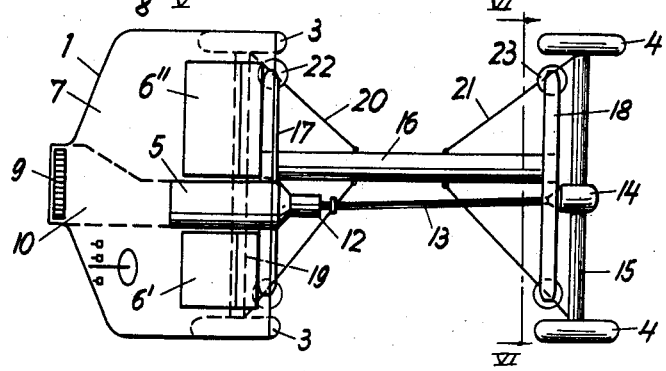

In the embodiment according to Figures 1, 2, and 5, the motor 5 is arranged between the front wheels or between the driver's seat 6' and the attendant's seat 6" in such a manner that it protrudes only slightly beyond the seats in a forward direction. Thus, a free space 7 is provided extending over the whole width of the vehicle including a low level floor 8 in front of the seats and in front of the motor. Only a relatively small channel or tunnel 10 may be arranged in the floor for the connections with the front radiator 9, whereby, however, the free motion of the driver or of his attendant is not substantially impeded in the cab 1. The steering gear leading from the steering column 11 to the front axle as well as the remaining conventional operating and transmission gear shifting means (not shown) required for operation of the motor vehicle, such as the connections for the clutch, brake, accelerator, etc., may be accommodated underneath the floor of the cab 1 or also in small channels in a well-known manner.

The driving force is transmitted from the motor through the change speed gear 12, the driving shaft 13, the rear axle gear 14 and the rear axle 15 to the rear wheels 4. The chassis comprises a central, tubular longitudinal bearer 16 which, as shown in Figure 2, is somewhat displaced laterally from the central longitudinal plane of the vehicle opposite to the motor gear block and the axle gear, and which is fixedly connected or welded to a front cross bearer 17 and a rear cross bearer 18. The front axle 19 and the rear axle 15, which may be formed rigidly, may be guided with respect to the frame by means of diagonal torque beams or thrust rods 20, and 21, which are linked to the frame by lateral joints and cushioned by helical springs 22, and 23, whose lower ends bear against the torque beams while their upper ends bear against the outwardly projecting end portions of the cross bearers 17 and 18. The springs 22 and 23 are spaced outwardly from the longitudinal bearer means 16 and lie beneath the end portions of the cross bearers nearer to the wheels than to the longitudinal bearer means 16 and also nearer to the outer ends of the torque beams than to the inner ends of the latter. The oblique positioning of the rods 20 and 21 relative to longitudinal bearer means 16 and the position of the axles 15 and 19 beyond the ends of the longitudinal bearer means is such that the axles may move vertically unimpeded by any portion of the longitudinal bearer means. The loading trough 2 projects only by a small amount over the rear axle.

Figure 3:
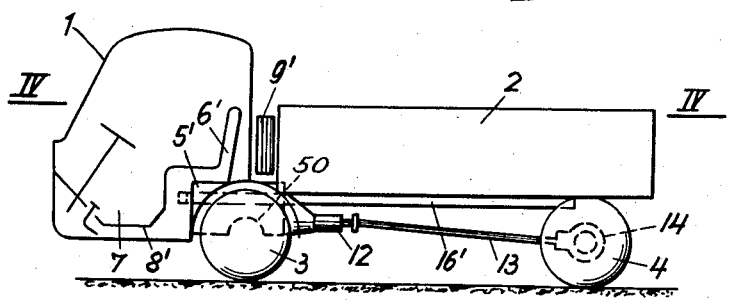
Figure 3 is a side elevational view similar to Figure 1 of a second embodiment in accordance with the present invention.
Figure 4:
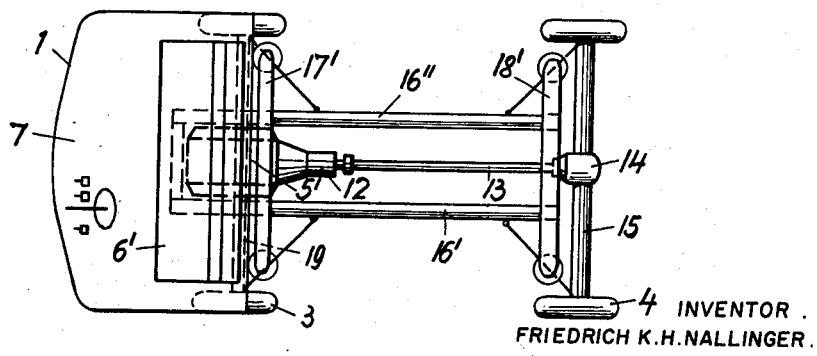
Figure 4 is a sectional view taken along line IV—IV of Figure 3, also with the loading trough not shown for clarity's sake.

In the embodiment shown in Figures 3 and 4, the engine 5', comprising horizontal or V-shaped cylinders, is suspended between a frame consisting appropriately of two tubular longitudinal bearer members 16' and 16" which are advantageously spaced from each other by an amount just sufficient to mount the motor therebetween which is thereby enclosed on both sides thereof by the bearer members 16' and 16". The cross bearers 17' and 18', which may also be tubular and welded to the longitudinal bearers, serve as outriggers, as in the first embodiment, for supporting helical springs 22 and 23 or the like. In a manner similar to the arrangement of Figure 2 showing a single longitudinal bearer, the longitudinal bearers 16' and 16" closely adjacent the sides of the motor and nearer to the longitudinal vertical center plane than to the wheels, define a chassis portion that is quite narrow relative to the vehicle track or the transverse distance between the vehicle wheels. The ends of the cross bearers 17' and 18' project a substantial distance beyond the longitudinal bearers and engage the vertical springs which are located nearer to the wheels than to the longitudinal bearers. Also the springs are spaced from the respective axles and engage the torque beams at points nearer to the outer ends thereof than to the ends pivotally connected at the outside of the longitudinal bearer members. As seen in both Figures 2 and 4 the front torque bearer members converge toward the rear whereas the rear torque bearer members converge forwardly, all being disposed diagonally relative the longitudinal bearer members. In a vertical direction the engine 5', which may be of the type with horizontal cylinders, is moreover disposed in the space between the front axle 19, for which an approximate channel-shaped recess 50 may be provided in the motor casing, if so desired, and the seat 6' which is arranged forwardly of the front axle and extends uninterruptedly over the entire vehicle width thereof. The radiator 9' behind the driver's cab may receive the cooling air from the side or from below, for example, through the double-walled floor 8' and through the space under the seats 6' on the side of the motor.

By reason of the trapezoidal suspension or support of the axles, i.e., by reason of connection of each torque beam at the longitudinal bearer members 16' and 16", as contrasted with a triangular suspension in which the two diagonal torque beams 20 or 21 are connected at the frame in a common pivot point, it is possible to forego special cross supports for the axles in spite of the use of non-guiding helical coil springs, as long as a rigid connection between axle and torque beam is assumed. As seen in Figure 4, the rear axle 15 may be displaced vertically without interference by the longitudinal bearer members 16' and 16", and the torque beam members connected to the rear axle provide support for the latter crosswise of the vehicle.

In the illustrated embodiment according to Figure 7, the cab 1 is mounted on the front end of the longitudinal beams 51 and bolted thereonto at 24 and 25. Motor 5" is arranged underneath a hood 26 which is linked at 27 to the cab or chassis and which hood 26 supports a foldable seat 52. The motor drives a shaft 13" and an axle gear 14" of the front wheels by means of a transmission 12". The front wheels may, for example, be steered independently of each other by links. Floor 8 is again arranged as low as possible, approximately at the height of the wheel center, and is merely intersected by a tunnel 10 whose upper edge 53 is arranged only slightly above the remaining floor so that it offers substantially no obstruction. The longitudinal beams 51 terminate underneath seat 52, and thereby also do not obstruct the foot space in front of the seats so that a foot space 7 which extends substantially freely over the entire width of the vehicle is assured.

In each case the motor is advantageously covered. By removal of the covering bonnet, if necessary after lifting the seats, the motor can easily be inspected and attended. Advantageously the arrangement is made so that on release of the operating members, etc., to be operated by the driver, and on loosening the necessary fastening screws, the driver's cab can be removed from the vehicle as a unit. The invention can also be applied to vehicles with front wheel or four wheel drive.

While the invention has been described in detail with respect to certain now preferred examples and embodiments of the invention, it will be understood by those skilled in the art after understanding the invention, that various changes and modifications may be made without departing from the spirit and scope of the invention, and it is intended therefore, to cover all such changes and modifications in the appended claims.

Having thus described my invention, I claim as new and desire to secure by Letters Patent:

1. In a motor vehicle comprising a pair of front wheels, a pair of rear wheels, a vehicle frame with longitudinal bearer means arranged more closely to the vehicle longitudinal center plane than to said wheels, a front cross bearer and a rear cross bearer, said cross bearers, extending with the ends thereof beyond the sides of said longitudinal bearer means, a front axle connecting said front wheels disposed ahead of said front cross bearer, a rear axle connecting said rear wheels behind said rear cross bearer, a pair of thrust rods for said front axle connected with said front axle in proximity of said wheels and disposed from said front axle rearwardly inwardly at an inclination against said longitudinal bearer means with means for pivotally connecting said thrust rods with said longitudinal bearer means on the outside thereof, vertically arranged springs supported with the upper ends against the ends of said front cross bearer and with the lower ends thereof against said thrust rods, a further pair of thrust rods for said rear axle, connected with said rear axle in proximity with said rear wheels and disposed at an inclination from said rear axle forwardly and inwardly against said longitudinal bearer means with means for pivotally connecting said thrust rods with said longitudinal bearer means on the outside thereof, and further vertically arranged springs supported with the upper ends thereof against the ends of said rear cross bearer and with the lower ends thereof against said further thrust rods.

2. In a motor vehicle, the combination according to claim 1, wherein said longitudinal bearer means consists of two longitudinal bearers arranged closely to and on both sides of a vertical longitudinal center plane of the vehicle.

3. In a motor vehicle the combination according to claim 1, wherein both cross bearers enclose the frame toward the front and rear respectively, said longitudinal bearer means terminating at said cross bearers.

4. In a motor vehicle, a vehicle chassis including longitudinal bearer means, front and rear transverse bearer means extending transversely at the ends of said longitudinal bearer means, a pair of front wheels including a front axle located forwardly of the front transverse bearer means, a pair of rear wheels including a rear axle located rearwardly of the rear transverse bearer means, said longitudinal bearer means defining a portion of said chassis that is quite narrow relative to the vehicle track, each of said transverse bearer means having ends projecting a substantial distance outwardly in opposite directions beyond said longitudinal bearer means so that the ends are disposed nearer to said wheels than to said longitudinal bearer means, torque beam means connected to the respective axles near the ends of the latter and interconnecting said axles with said longitudinal bearer means and extending obliquely inwardly toward said longitudinal bearer means, and spring means intermediate said torque beam means and the ends of said transverse bearer means, said spring means being located in spaced relationship with respect to said axles but nearer to the ends of said torque bearer means which are connected to the axles than to the opposite ends of said torque bearer means.

5. In a motor vehicle, a front axle, a rear axle, each axle supporting a pair of wheels at opposite sides of the vehicle, a chassis frame comprising a front cross bearer in the vicinity of and behind said front axle and a rear cross bearer in the vicinity and forward of said rear axle, the portion of said chassis frame extending longitudinally between said cross bearers being substantially narrower than the width of the vehicle between said wheels, each of said cross bearers having ends projecting outwardly in opposite directions a substantial distance beyond said narrow portion of the frame with said ends lying nearer to said wheels than to said narrow frame portion, a pair of rearwardly converging torque beams for supporting said front axle on said frame, said beams extending beneath the respective ends of said front cross bearer and diagonally inwardly toward the portion of the frame between said cross bearers, forwardly convergent torque beams for supporting said rear axle from said frame, said forwardly converging beams extending beneath the respective ends of said rear cross bearer diagonally inwardly toward the portion of the frame between said cross bearers, vertical springs between said front axle torque beams and the ends of said front cross bearer for cushioning said front axle with respect to said frame, and vertical springs between said rear axle torque beams and the ends of said rear cross bearer for cushioning said rear axle with respect to said frame.

6. In a motor vehicle, a chassis frame including longitudinal bearer means, transverse bearer means connected to one end of said longitudinal bearer means and having end portions projecting laterally in opposite directions outwardly a substantial distance beyond said longitudinal bearer means, a pair of wheels including axle means located on one side of said transverse bearer means opposite said longitudinal bearer means, means including torque beam means connecting said axle means to said longitudinal bearer means, said torque beam means being pivotally connected to said longitudinal bearer means at the outside thereof and spring means for supporting said torque beam means against the outer ends of said outwardly projecting portions of said transverse bearer means for resiliently supporting said wheels with respect to said vehicle chassis, said torque beam means extending obliquely outwardly relative to said longitudinal bearer means and engaging said spring means at positions spaced farther from said longitudinal bearer means than from said axle, said springs being located nearer to said wheels than to said longitudinal bearer means.

7. In a motor vehicle, a chassis frame including two spaced longitudinal bearer means, transverse bearer means connected to one end of said longitudinal bearer means, a pair of wheels including axle means located on one side of said transverse bearer means opposite said longitudinal bearer means and beyond the ends of the latter to permit vertical movement of the axle means unimpaired by the longitudinal bearer means, and suspension means including torque beam means connected to said axle means and to said longitudinal bearer means converging toward the latter and including spring means for supporting said torque beam means against said transverse bearer means to provide a substantially trapezoidal suspension diagram and to guide said wheels with respect to the vehicle chassis, said longitudinal bearer means being so spaced that the distance between the points of connection of said torque beam means thereto is substantially less than the distance between said wheels, said torque beam means being so constructed and arranged relative to said axle and to said longitudinal bearer means to provide support of said axle relative to said chassis frame crosswise of said vehicle.

References Cited in the file of this patent

UNITED STATES PATENTS

| | | |
|---|---|---|
| 1,079,249 | Lines | Nov. 18, 1913 |
| 2,035,212 | Alborn | Mar. 24, 1936 |
| 2,064,100 | Bachman | Dec. 15, 1936 |
| 2,151,229 | Piroumoff et al. | Mar. 21, 1939 |
| 2,345,448 | Best | Mar. 28, 1944 |
| 2,362,453 | Cosper | Nov. 14, 1944 |
| 2,367,817 | Brown | Jan. 23, 1945 |
| 2,396,506 | Harris | Mar. 12, 1946 |
| 2,475,487 | Ennis | July 5, 1949 |
| 2,480,934 | Julien | Sept. 6, 1949 |
| 2,502,622 | Harris | Apr. 4, 1950 |
| 2,564,888 | Foley et al. | Aug. 21, 1951 |
| 2,700,428 | Nallinger | Jan. 25, 1955 |

FOREIGN PATENTS

| | | |
|---|---|---|
| 349,688 | France | Apr. 7, 1905 |
| 267,099 | Italy | Aug. 24, 1929 |